United States Patent [19]

Evans

[11] 4,393,499
[45] Jul. 12, 1983

[54] ADAPTIVE SIGNAL QUALITY MEASUREMENT CIRCUIT FOR PSK AND FSK DEMODULATORS

[75] Inventor: Randall G. Evans, San Jose, Calif.

[73] Assignee: Ford Aerospace & Communications Corporation, Detroit, Mich.

[21] Appl. No.: 242,800

[22] Filed: Mar. 11, 1981

[51] Int. Cl.$^3$ .................... H04B 17/00; H04L 1/20
[52] U.S. Cl. ............................. 371/5; 371/22; 375/10; 455/67
[58] Field of Search ............. 371/5, 22, 64; 375/10; 455/67

[56] References Cited

U.S. PATENT DOCUMENTS

| | | | |
|---|---|---|---|
| 4,034,340 | 7/1977 | Sant'Agostino | 371/5 |
| 4,070,647 | 1/1978 | Robson | 371/5 |
| 4,305,150 | 12/1981 | Richmond et al. | 371/5 |

Primary Examiner—Charles E. Atkinson
Attorney, Agent, or Firm—Edward J. Radlo; Robert D. Sanborn

[57] ABSTRACT

In a demodulator for an antipodal data stream, such as a PSK or FSK demodulator, a signal quality measuring circuit having a high dynamic range. Any signal quality parameter can be measured, such as BER and $E_b/N_o$. The number of zero crossings in a certain error gate is compared with the total scaled number of zero crossings in the sampling interval. These values are translated into a quantitative measure of signal quality by means of a pre-established table of values obtained during calibration of the instrument. The wide dynamic range of the circuit is achieved by using several gates of various widths. The gates are derived from a bit synchronizer; the system functions without the necessity for superimposing upon the data stream any coding information as is common with BER measurement devices of the prior art.

8 Claims, 5 Drawing Figures

ADAPTIVE SIGNAL QUALITY MEASUREMENT CIRCUIT FOR PSK AND FSK DEMODULATORS

BACKGROUND OF THE INVENTION

1. Field of the Invention

This invention is a circuit for accurately measuring any quantifiable signal quality parameter, such as BER or $E_b/N_o$, of any antipodal data stream, such as FSK or PSK modulated data.

2. Description of the Prior Art

A prior art search uncovered the following U.S. patent references:

U.S. Pat. No. 4,234,954 estimates BER by counting the number of instances in which the received signal deviates more than twice the normal amount from the reference level. It is not adaptive as in the present invention, nor does it compare live measurements with stored experimental data.

U.S. Pat. No. 3,721,959 is not adaptive as in the present invention, and does not give the actual value of signal quality as in the present invention, but rather makes a good/bad determination.

U.S. Pat. Nos. 4,100,531; 3,978,406; 3,911,395 and 3,824,548 require the transmission of coding information over the data link, unlike the present invention which requires no such coding information.

U.S. Pat. Nos. 4,091,240 and 4,091,239 monitor BER performance by using two demodulators. The present invention requires only one demodulator.

U.S. Pat. No. 4,110,691 detects errors in a seven level correlative waveform, unlike the antipodal data stream of the present invention.

U.S. Pat. Nos. 4,167,701 and 4,118,686 perform error corrections, unlike the present invention.

Related Patent Application

U.S. patent application Ser. No. 242,777, filed on the same date as the instant application, and having the same applicant and assignee.

SUMMARY OF THE INVENTION

The present invention works upon any bandlimited antipodal data stream (a data stream having two voltage levels representing two distinct data states) that is corrupted by the addition of noise. All the zero crossings, or a down-scaled version thereof, are counted in a population counter. Simultaneously, all the "error" zero crossings outside of a certain deadband are counted in a sample counter by means of gating them with repetitive gate pulses of varying widths. Once the sample counter has been filled to its preestablished capacity, the count in the population counter is applied as part of the address input to a memory device containing a pre-programmed lookup table which outputs the proper value of signal quality, such as BER or $E_b/N_o$. The output signal quality information can be displayed upon, e.g., an LED display.

Use of multiple gates greatly extends the dynamic range of the instrument. The memory determines the optimum gate for the particular value of population counted during the most recent sampling cycle and for the gate actually used during that cycle. A switch switches the optimum gate thus determined into the system for the next sampling cycle. The ranges for the gates had been previously chosen by selecting that gate exhibiting the steepest slope of the population versus signal quality curve for that particular value of signal quality and for a preselected maximum population size.

Each of the gates is generated as an adjunct to a clocking signal generated by a conventional bit synchronizer. The circuit does not require the superimposition onto the data stream of any coding information.

The novel advantages of this invention are:

The adaptiveness feature (use of several different gates) optimizes the ratio of population size to sample size and makes possible the great dynamic range. The illustrated preferred embodiment breadboard was found to be accurate up to $E_b/N_o = 15$ dB when used in a BPSK demodulator, but since anything above 12 dB is extremely noise-free (6 dB being usually acceptable) the device was constructed for a maximum $E_b/N_o$ of 12 dB. The high practical limit for $E_b/N_o$ is 16 or 17 dB, limited only by the residual jitter of the bit synch. With an analog bit synch, one could practically get to 20 dB.

The system performs fast measurements even for high values of signal quality.

Other measures of signal quality besides $E_b/N_o$, such as BER, can be designed into the system.

The device uses actual prior data to give an estimate of signal quality with a known degree of accuracy and certainty.

By gating the zero crossings of the noise corrupted signal with the recovered bit synchronized clock zero crossings, no coding information need be superimposed onto the data stream.

The circuit is much faster than analog signal quality estimators. It can be used up into the gigabit range. It is limited only by the speed of the digital devices. Presently the technology exists for data rates in excess of 100 million bits per second.

It can be used for any antipodal bit pattern.

BRIEF DESCRIPTION OF THE DRAWINGS

These and other more detailed and specific objects and features of the present invention are more fully disclosed in the following specification, reference being had to the accompanying drawings, in which.

DESCRIPTION OF THE PREFERRED EMBODIMENTS

The input signal can be any antipodal data such as PSK or FSK modulated data. Antipodal data is data that is transmitted over the data link in an analog waveform, but encapsulates digital information inasmuch as only two states (e.g., ones and zeroes) are present. This input signal is pure data, with no coding or synchronizing information being necessary for the proper functioning of the present invention.

Figure 1:
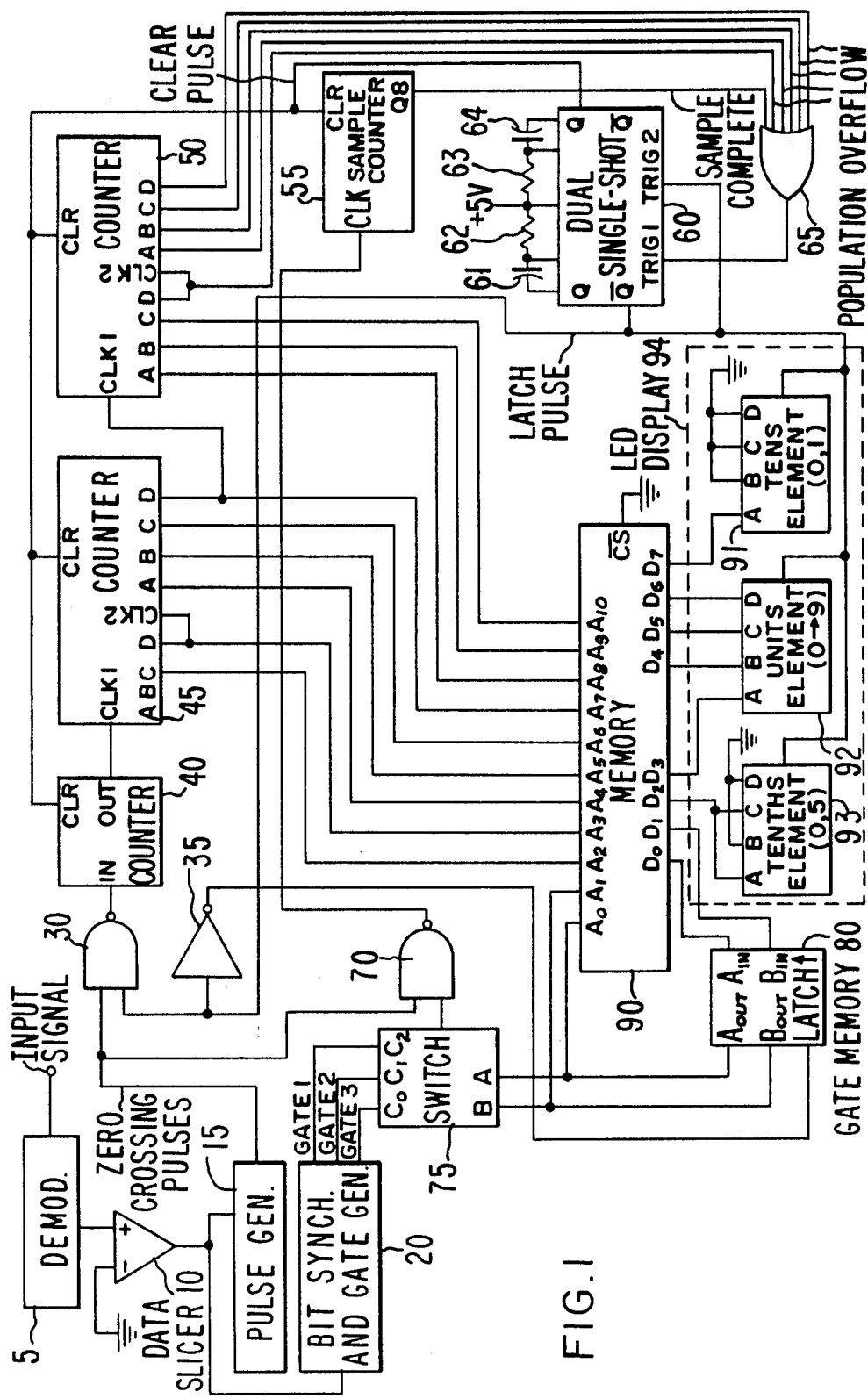
FIG. 1 is a circuit diagram of a preferred embodiment of the present invention.
Figure 2:
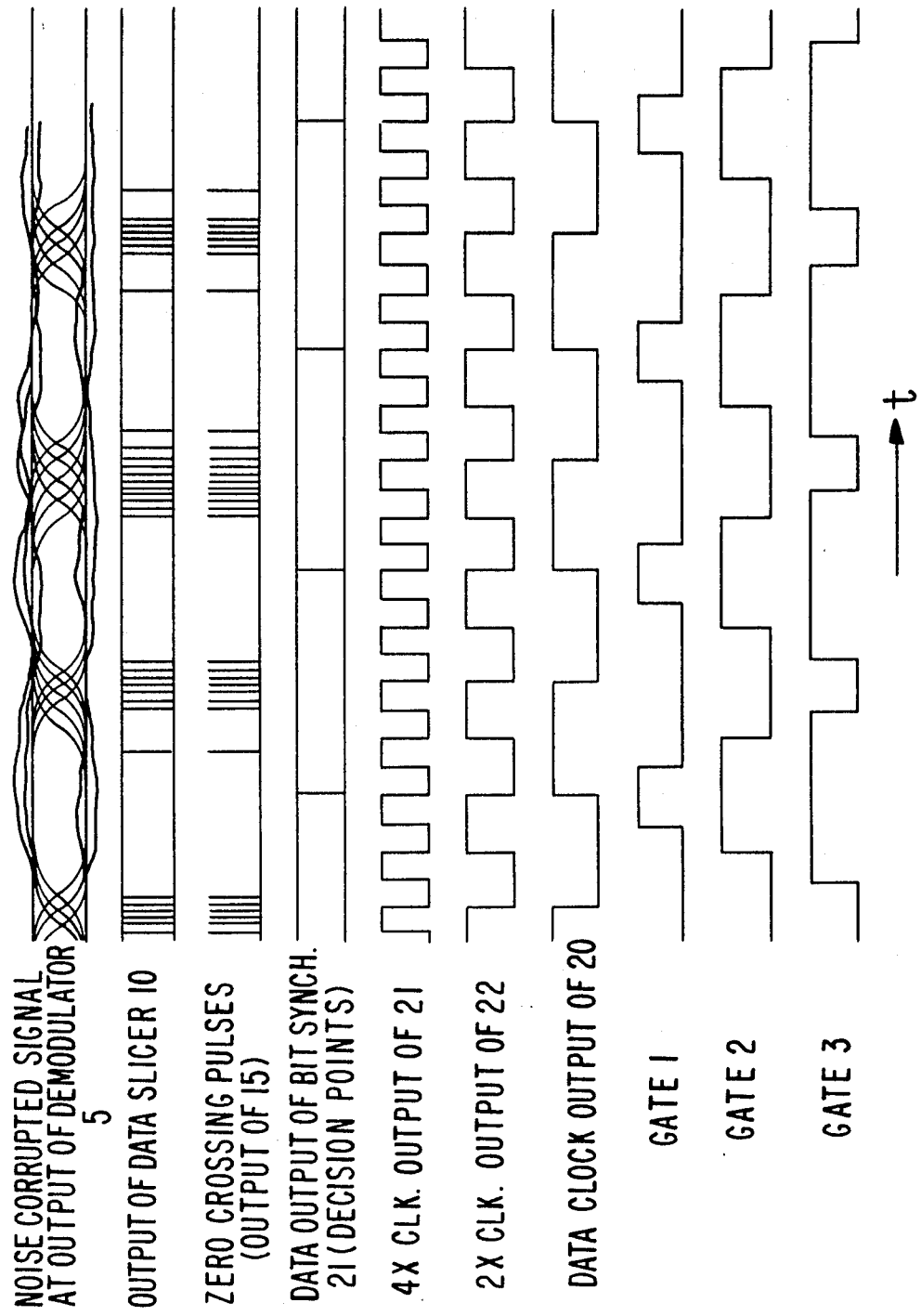
FIG. 2 is a set of time superimposed voltage waveforms illustrating the timing relationships within FIG. 1.

The input signal is applied to demodulator 5 as illustrated in FIG. 1. FIG. 2, on which an ordinate represents a voltage and an abscissa represents time, with waveforms superimposed to show several periods of time, shows as the topmost waveform the data signal as it appears at the output of demodulator 5. It can be seen that there is a region where the zero crossings (time locations where the data changes from a high to a low, i.e., from a 1 to a 0 state or vice versa) normally occur. This demodulated signal is invariably corrupted by noise owing to the vagaries of the propagation medium, such as the earth's atmosphere, through which the signal journeys. These noise perturbations result in erroneous data decisions, i.e., highs counted as lows and lows counted as highs, thereby degrading the performance of the data link. The present invention measures the degree of such degradation by measuring a parameter associated with the signal degradation by measuring a parameter associated with the signal quality of the system. Such parameters that are commonly used are BER and $E_b/N_o$. Most of the discussion herein treats a preferred embodiment wherein $E_b/N_o$ is measured, but the teachings and principles of the present invention are equally applicable to the case where another signal quality parameter has been chosen.

After demodulation, the data passes through data slicer 10, a comparator. The data is fed to one of the inputs of comparator 10 while the other input is grounded. Thus, comparator 10 serves to square off the incoming waveform so that vertical zero crossings are obtained as an aid for subsequent processing. The output of slicer 10 is the second waveform in FIG. 2.

Next the data is routed through two paths. One path is through bit synchronizer and gate generator 20 and the other path goes to pulse generator 15.

Pulse generator 15 creates a measurably high pulse of extremely short duration upon the occurrence of each change in sign in the signal fed to its input. In other words, pulse generator 15 (its output is depicted as the third waveform in FIG. 2) creates a positive pulse at each zero crossing regardless of the direction of the zero crossing.

The output of bit synchronizer and gate generator 20 is a set of three error decision gates, depicted in FIG. 2. The high portions of each gate represent regions where, if a zero crossing occurs, an event that is statistically related to an error is assumed. The low portions of each gate represent deadband regions, where zero crossings should occur in the absence of noise. Gate 1, with narrower high regions than deadband regions, is used when the expected signal quality is low. Gate 2, an intermediate gate having equal high and low regions, is used when the expected signal quality is midrange. Gate 3, a wide gate having wider high regions than low regions, is used when the expected signal quality is high. As can be seen in FIG. 2, the midpoint of each deadband region of each gate is centered on a mean zero crossing point of the data stream. The repetition frequency of each gate is equal to the data rate (bit rate of the input data stream).

Figure 3:
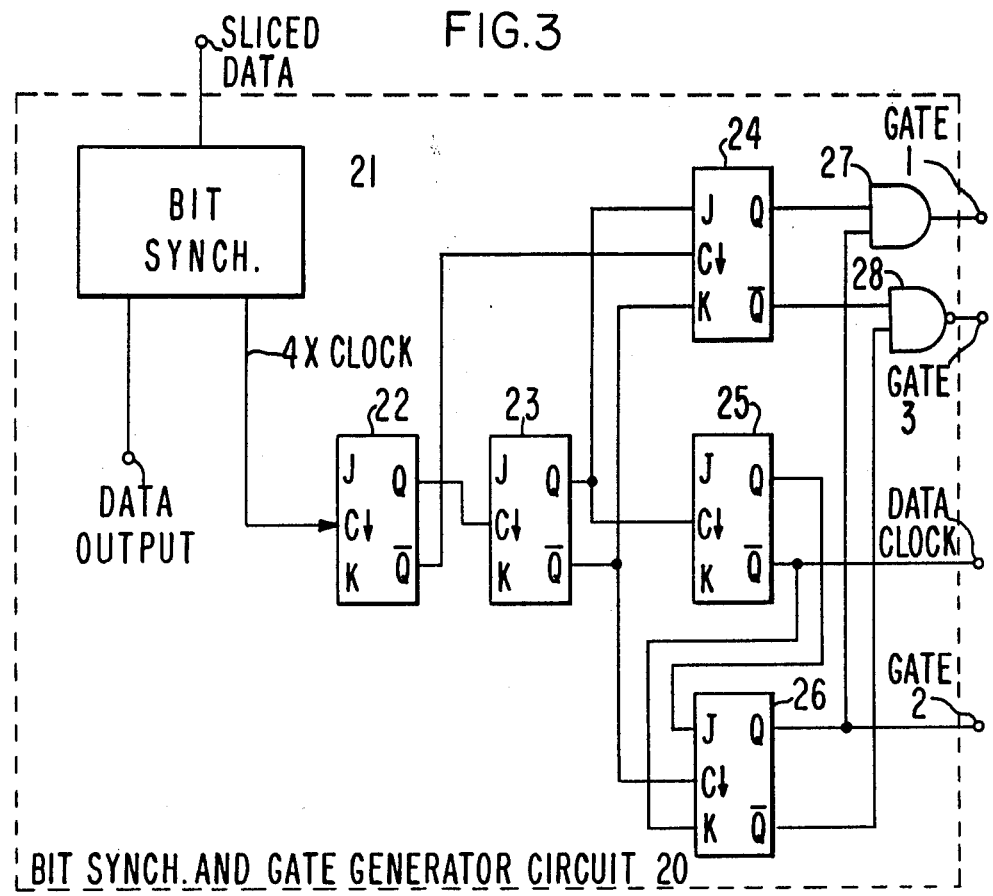
FIG. 3 is a detailed circuit diagram of a bit synchronizer and gate generator circuit usable in the preferred embodiment illustrated in FIG. 1.

The gate generation circuit is shown in detail in FIG. 3. The number of gates is somewhat arbitrary. Three gates have been shown for purposes of illustration; however, a different number of gates could be employed. For example, if one wishes to extend the dynamic range of the instrument from the 12 dB of $E_b/N_o$ illustrated herein, or to obtain greater accuracy within the given dynamic range, one might wish to use four gates. Similarly, the percentage of time that a gate is in a high state can be made to vary.

Bit synchronizer 21 can be any bit synchronizer as long as it produces a squarewave output having a frequency of four times the data rate. This is known as the 4 X clock output. Another output of bit synchronizer 21 is a data output where one can measure the highness or lowness of the data bits to determine the proper sequence of ones and zeroes.

Points where decisions are made on the data as to its highness or lowness are illustrated by the fourth waveform of FIG. 2 which shows that the decision points are midway between the mean zero crossing points of the sliced data stream. The exact location of any decision point is not important to the operation of the present invention.

The 4 X clock output is illustrated on FIG. 2. This pulse stream is fed to the clock input of JK flipflop 22. The Q output of flipflop 22 is connected to the clock input of JK flipflop 34. The $\overline{Q}$ output of flipflop 22 is connected to the clock input of JK flipflop 24. The $\overline{Q}$ output of flipflop 23 is connected to the J input of flipflop 24 and to the clock input of JK flipflop 25. The Q output of flipflop 23 is connected to the K input of flipflop 24 and to the clock input of JK flipflop 26. The Q output of flipflop 25 is connected to the J input of flipflop 26. The $\overline{Q}$ output of flipflop 25 is the data clock, i.e., a square pulseform traveling at the same frequency as the data (FIG. 2). This is also fed to the K input of flipflop 26. The Q output of flipflop 26 is gate 2 and is also fed to one input of AND gate 27. The $\overline{Q}$ output of flipflop 26 is fed as one input to NAND gate 28. The Q output of flipflop 24 is fed as the second input of AND gate 27. The $\overline{Q}$ output of flipflop 25 is fed as the second input to NAND gate 28. The output of AND gate 27 is gate 1. The output of NAND gate 28 is gate 3.

The output of flipflop 22 is the 2 X clock, i.e., a pulse train operating at twice the clock frequency. The purpose of flipflops 24, 25, and 26 is to change the phase of the gates so that each low region occurs centered about a mean zero crossing point of the data stream.

Turning again to FIG. 1, the zero crossing pulses from the output of pulse generator 15 are fed as a first input to NAND gate 30. The output of NAND gate 30 becomes the input to counter 40, which scales the input data so that it is more easily managed. For example, when counter 40 is one half of a 74393 counter, it assumes a divide by 16 function, which means that one pulse appears at the output of counter 40 for every 16 pulses appearing at the input of counter 40. The output of counter 40 becomes the clock 1 input of counter 45, which can be an 8 stage binary counter such as a 74393. The D output of the last stage of counter 45 is fed as the clock 1 input to counter 50, which can be another 74393 counter, thereby extending the capacity of counter 45. Together, counters 45 and 50 constitute a population counter which keeps track of the total scaled number of zero crossings during each sampling interval.

The five most significant data outputs (the first D and the second A, B, C, and D outputs) of counter 50 are fed as inputs to OR gate 65. At least one of these lines becomes activated when population counter 45, 50 exceeds a pre-established maximum value, which in this case is 2047. In such an eventuality, all of the nine data outputs of counter 45, 50 that are connected to memory 90 will be high, and memory 90 can be preprogrammed to react to this condition by displaying upon display 94 a graphic indication that the population counter 45, 50 has overflowed and therefore a proper measurement cannot be taken for this sampling interval. It is desirable to select counters 45 and 50 to have enough capacity so that the pre-established maximum population value will give good readings for the higher values of signal quality expected.

The output pulses from pulse generator 15 are also fed as a first input to NAND gate 70. Switch 75 controls whether gate 1, gate 2, or gate 3 is fed, as the output of switch 75, to the second input of NAND gate 70. Switch 75 can be a 74LS153, in which case $C_0$ is connected to gate 3, $C_1$ is connected to gate 2, and $C_2$ is connected to gate 1. Signals applied at the A and B inputs of switch 75 control which of the three gates is fed to NAND gate 70. NAND gate 70 serves to pass through as its output only those zero crossing pulses which occur during the high regions of the particular gate employed for that sampling interval. This information becomes the clock input to sample counter 55, which serves as the error counter. Counter 55 can be an 8 stage binary counter such as a 74393 with a capacity of 128. Lowering the size of sample counter 55 worsens the accuracy of the device but shortens the sampling time, and vice versa. With the sample counter size of 128 for a 16 kilobit per second data rate, the greatest sampling time, for the highest values of $E_b/N_o$, was about 4 seconds (corresponding to an average of 8000 zero crossings per second for random data, 500 scaled zero crossings per second, and a scaled population size of 2000).

Figure 4:
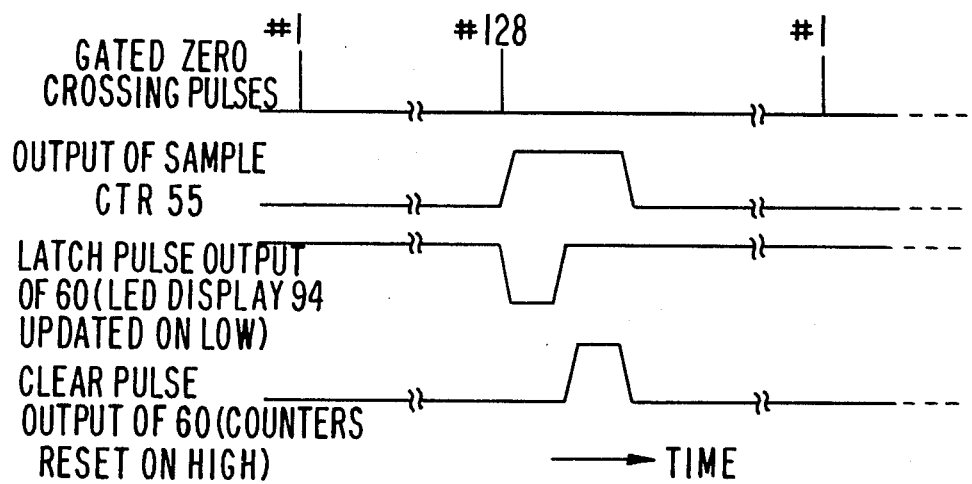
FIG. 4 is a set of timing diagrams illustrating the latching and clearing functions of the FIG. 1 circuit.

When the capacity of counter 55 has been reached, a sample complete signal is sent over the most significant data output (shown as the Q8 output) of counter 55 as an input to OR gate 65, which will pass this signal or a population overflow signal from counter 50 to the TRIG1 input of dual single-shot pulse generator 60, such as a 74LS123, which generates two nonoverlapping pulses, as depicted in FIG. 4, in response to the rising edge of the pulse outputted by 65. The first pulse is a latch pulse and is a negative pulse of rather short duration. This latching signal is outputted by the Q output of the first stage of dual single-shot 60 and is sent to display elements 91, 92 and 93, thereby instructing these elements to latch onto and display that information at their data inputs at that moment. The latch pulse is also fed as a second input to NAND gate 30, thus temporarily inhibiting the counting of zero crossing pulses. The latch pulse is further fed as the input to inverter 35, which can be an inverting op amp, thereby changing the polarity of the latch pulse before being fed as the latch input to gate memory 80, which is a two bit memory such as a 74LS74. The reason for inverter 35 is that gate memory 80 latches in response to a positive rather than a negative latch pulse. Upon receiving the latch pulse, gate memory 80 feeds the binary-coded gate designation from its $A_{in}$ and $B_{in}$ terminals to its $A_{out}$ and $B_{out}$ terminals and thence to the A and B inputs of switch 75, thereby commanding the gate to be used for the next sampling interval, based upon the optimum gate determination performed by memory 90.

The second pulse produced by dual single-shot 60 is a clear pulse, a positive pulse of rather short duration as illustrated in FIG. 4, outputted by the Q output of the second stage of dual single-shot 60 in response to the rising edge of the end of the latch pulse triggering TRIG2. The clear pulse is used to instruct sample counter 55, scaling counter 40, and population counter 45, 50 to clear all of their stages back to zero in preparation for the next sampling interval, which may begin immediately.

Capacitor 61 and resistor 62 are used to set the duration of each latch pulse and are connected to the first stage of dual single-shot 60 as shown. Resistor 63 and capacitor 64 are used to set the duration of each clear pulse, and are connected to the second stage of dual single-shot 60 as shown. Appropriate values for each of capacitors 61 and 64 are 100 picofarads. Appropriate values for each of resistors 62 and 63 are 5.1K Ohms. Using these values results in 1 microsecond latch and clear pulses.

Thus when sample counter 55 reaches its capacity, the contents of population counter 45, 50 are translated by memory 90 into signal quality information and displayed by display 94 until display 94 receives the next latch pulse. In the example illustrated, six bits are fed from counter 45 to memory 90. The two least significant bits (from the A and B outputs of the first stage of counter 45) are not fed to memory 90; this has the effect of resolving the population data by decimal 4's. Three bits, representing the most significant bits, are fed from the A, B, and C data outputs of the first stage of counter 50 to memory 90. Thus, memory 90 has nine input bits ($A_2$ through $A_{10}$) representing the total scaled number of zero crossings that occurred for each sampling interval, with each such population count being divisible by 4.

Memory 90 has two additional binary inputs, $A_0$ and $A_1$, designating that gate that was employed during the most recent sampling interval. These eleven inputs (select lines) are enough to constitute all the inputs of memory 90 when it is a 2K by 8 ROM, such as a 2716 EPROM. Such an EPROM outputs eight bits in unique response to each eleven bit address, and has a storage capacity of 2048 memory cells. The first two output bits, $D_0$ and $D_1$, are the binary designation of that gate which memory 90 determines is optimum for the signal quality just measured (based upon the measured population size, known sample size, and actual gate used during the most recent sampling interval). The two bits designating the optimum gate are conveyed via gate memory 80 to switch 75 which selects this gate for the next sampling interval. The remaining six output bits, $D_2$ through $D_7$, of memory 90 contain signal quality information. The $\overline{CS}$ (chip select bar) terminal of memory 90 is grounded.

The illustrated preferred embodiment was designed to measure and display $E_b/N_o$ through the range 0 dB to 12 dB in one-half dB increments. These values of $E_b/N_o$ are displayed on LED display 94, comprising tens element 91, units element 92, and tenths element 93. The tens element 91 will be either a 0 or a 1; thus one binary bit, $D_7$, from memory 90 is sufficient to convey this information. The units element 92 may be asked to display any decimal number from 0 to 9, thus requiring four binary bits to convey this information, the $D_3$, $D_4$, $D_5$, and $D_6$ outputs of memory 90. The tenths element 93 will be asked to display either a 0 or a 5; just one binary bit is needed to convey this information, designated $D_2$ from memory 90. In the embodiment illustrated, LED display 94 is a Texas Instruments TI-311, with pin wirings as shown on FIG. 1. Alternatively, 94 can be any display or storage means, e.g., hard copy, paper tape, magnetic tape, disk, or bubbles, etc.

Memory 90 contains stored information concerning quantified signal quality as a function of population size for a given sample size and given data rate. This information is pre-stored into memory 90 during the calibration phase of the instrument as follows. First, the most common data rate that the system will be operating under is selected. For other bit rates, there will be some variation in the population figures as a function of signal quality depending on the characteristics of the particular demodulator. The numbers illustrated herein were obtained for a BPSK demodulator 5 operating at a rate of 16Kbps. The sample counter 55 was chosen to have a maximum capacity of 128. A high accuracy calibration test set was used, which included the injection of noise at precise known levels between the BPSK modulator and demodulator, a calibrated filter of known noise bandwidth, and a power meter. These were used to accurately (within 0.5 dB) measure $E_b/N_o$ over the range of 0 dB through 12 dB. A BER test set was also used to calibrate the instrument for BER.

About 40 measurements of scaled population size were taken for each of 13 values of $E_b/N_o$ in 1 dB steps. For each set of population data, the mean and the standard deviation were calculated. The following table shows the mean scaled population size and standard deviation as a function of $E_b/N_o$ for each of the three gates for the fixed sample size of 128 and the bit rate of 16Kbps. A standard deviation analysis (see also FIG. 5) shows that one-half dB accuracy in $E_b/N_o$ throughout the entire range was in fact obtained to a certainty of three standard deviations throughout the entire range of data except in the vicinity of 0 dB.

|        | $E_b/N_o$ (dB) | mean scaled population size | standard deviation |
|--------|-----|------|----|
| gate 1 | 0   | 846  | 32 |
|        | 1   | 985  | 16 |
|        | 2   | 1227 | 35 |
|        | 3   | 1627 | 42 |
| gate 2 | 3   | 599  | 11 |
|        | 4   | 781  | 19 |
|        | 5   | 1063 | 23 |
|        | 6   | 1606 | 34 |
| gate 3 | 6   | 361  | 7  |
|        | 7   | 426  | 9  |
|        | 8   | 517  | 9  |
|        | 9   | 643  | 12 |
|        | 10  | 840  | 20 |
|        | 11  | 1155 | 23 |
|        | 12  | 1796 | 35 |

Figure 5:
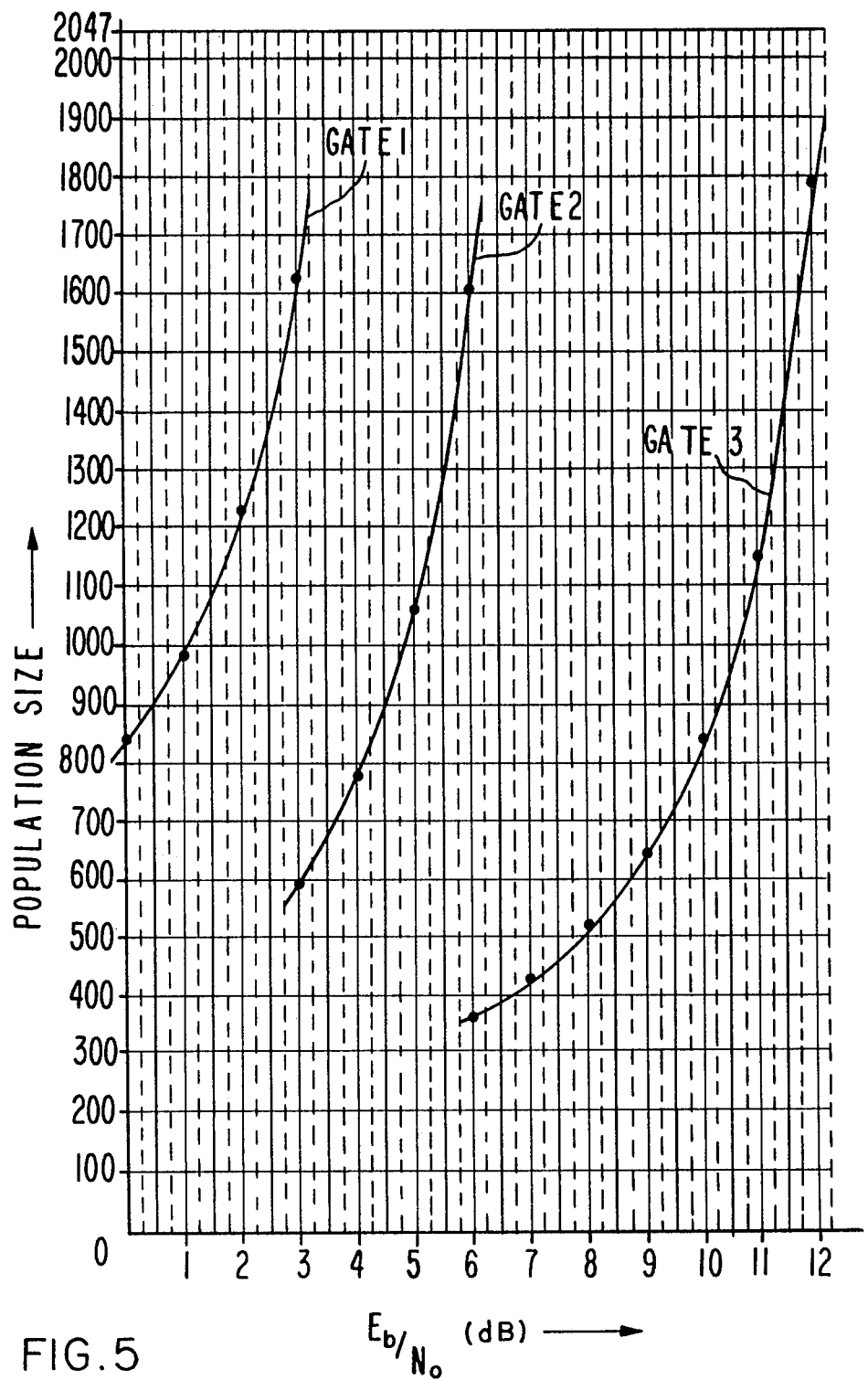
FIG. 5 is a set of curves, one for each gate, showing the population count as a function of signal quality for the FIG. 1 embodiment for a certain sample counter size and data rate.

The above data were then graphically plotted onto FIG. 5. Interpolation was performed for each one half dB of $E_b/N_o$ as shown by the vertical solid lines, then one quarter dB lines were drawn as vertical dotted lines on either side of each vertical solid line to determine the population thresholds for each one-half dB of $E_b/N_o$. This data was then fed into EPROM 90 in the form of each divisible-by-four scaled population value from 0 through 2044 from each gate being assigned to a unique memory location. Thus, 512 memory locations were allocated for each gate. The remaining 512 locations of EPROM 90 were left vacant for possible future use, e.g., with a fourth gate. For each memory location eight bits were stored, two bits representing the optimum gate and six bits representing the value of $E_b/N_o$.

The optimum gate selections were made by first limiting consideration to scaled population values less than 2048, since higher values would result in overly long sample intervals and/or overly large memory and counter sizes. Within this population range, the optimum gate for a given value of signal quality is that gate exhibiting the steepest slope of the population versus signal quality curve at that point. This criterion was chosen so as to avoid data compression. On this basis, the following gates were selected to be optimum over the following $E_b/N_o$ ranges for the example illustrated in FIG. 5: Gate 1—0 dB through 3 dB; gate 2—3.5 dB through 6 dB; gate 3—6.5 dB through 12 dB. This information was then stored in the $D_0$, $D_1$ portions of memory 90.

Memory 90 can be programmed to display upon display 94 error messages for out-of-scale readings. With the simple Tl-311 LED display illustrated, the high error message can be a "19.5" and the low error message can be a "00.0". Alternatively, blanks can be displayed in lieu of error messages. For example, suppose gate 2 is in use and a scaled population of 1800 is measured. The high error message will be outputted by $D_2$ through $D_7$ and the binary representation for the next higher gate, i.e., gate 3, will be outputted by $D_0$ and $D_1$.

If gate 3 is in use and a scaled population count of 200 is measured, $D_2$ through $D_7$ will output signals to convey the low error message, and $D_0$ and $D_1$ will convey bits designating the next lower gate, i.e, gate 2, as optimum.

Suppose gate 3 is in use and a scaled population value of 360 is recorded. $D_2$ through $D_7$ will properly output a binary signal representing 06.0 dB, but $D_0$ and $D_1$ will indicate that gate 2 is the preferred gate, which will be switched into the system by switch 75 for the next sampling interval. If the input data stream remains at a quality level of $E_b/N_o=6$ dB, the next sampling interval will record a scaled population value of approximately 1608.

The above description is included to illustrate the operation of the preferred embodiments, and does not limit the scope of the invention. The scope of the invention is to be limited only by the following claims. From the above discussion, many variations will be apparent to one skilled in the art that would yet be encompassed by the spirit and scope of the invention. For example, instead of using a deadband defined exclusively in terms of phase deviations, a deadband defined in terms of amplitude deviations or a combination of amplitude and phase deviations could be employed. Techniques for constructing gates implementing these types of deadbands are well known to those skilled in the digital communications art.

What is claimed is:

1. A circuit for measuring the signal quality of an antipodal stream of data bits comprising:
   connected to said data stream, means for generating, at the same frequency as the bit frequency of said data stream, several different repetitive patterns of pulses, each pattern having a deadband region and an error region;
   connected to said data stream and to said generating means, means for combining said stream with one of said patterns so that bits from said stream can be observed to fall within either of said regions by virtue of observing means connected to said combining means.

2. The circuit of claim 1 wherein said circuit operates over each of a series of successive sampling periods, said circuit further comprising:
   connected to said observing means and to said combining means, means for determining that pattern which is expected to result in the most accurate measurement of signal quality for the next sampling period.

3. The circuit of claim 2 wherein the observing means comprises a population counter which counts data stream bits within each sampling period, and an error counter which counts during each sampling period data bits falling within the error region of that pattern selected by the determining means at the conclusion of the most recent sampling period.

4. The circuit of claim 3 wherein the determining means selects that pattern, which, for a preselected maximum sampling period and given error count, exhibits the steepest slope of the population count versus quantified signal quality curve for that value of signal quality measured during the most recent sampling period.

5. The circuit of claim 3 wherein the observing means further comprises: connected to said population counter and to said error counter, means for converting the counts accumulated by the population counter and the error counter into a quantitative representation of signal quality.

6. The circuit of claim 5 wherein a sampling period is defined as that time required to fill the error counter to capacity;

said circuit further comprising display means connected to said converting means for displaying said quantitative representation associated with the most recent sampling interval.

7. The circuit of claim 1 wherein each deadband region corresponds to time locations where the data bits, if error-free, change state from one of the two antipodal states to the other state.

8. The circuit of claim 1 wherein said data stream consists solely of data bits, no coding information being superimposed thereon.

* * * * *